United States Patent
Bloy et al.

(10) Patent No.: US 11,367,070 B2
(45) Date of Patent: Jun. 21, 2022

(54) SYSTEM AND METHOD FOR PROVISIONING A DATA TRANSFER APPLICATION

(71) Applicant: The Toronto-Dominion Bank, Toronto (CA)

(72) Inventors: Adrian Bloy, Toronto (CA); Ryan Edmund Vekeman, Toronto (CA); Connie Maun-Fong Chan, Toronto (CA); Sebastien Forget, Toronto (CA); Daniel Lam Tin Cheung, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 378 days.

(21) Appl. No.: 15/708,887

(22) Filed: Sep. 19, 2017

(65) Prior Publication Data

US 2019/0089784 A1    Mar. 21, 2019

(51) Int. Cl.
*G06Q 20/38* (2012.01)
*G06Q 20/40* (2012.01)
(Continued)

(52) U.S. Cl.
CPC .......... *G06Q 20/385* (2013.01); *G06F 9/547* (2013.01); *G06Q 20/10* (2013.01); *G06Q 20/32* (2013.01);
(Continued)

(58) Field of Classification Search
CPC .. G06Q 20/00; G06Q 20/401; G06Q 2220/00; H04L 67/1097; H04L 67/34; G06F 9/547
See application file for complete search history.

(56) References Cited

U.S. PATENT DOCUMENTS

| | | | |
|---|---|---|---|
| 7,249,097 B2* | 7/2007 | Hutchison | G06Q 20/02 705/39 |
| 7,349,871 B2* | 3/2008 | Labrou | G06Q 20/02 705/26.35 |

(Continued)

OTHER PUBLICATIONS

M. A. Sirbu, "Credits and debits on the Internet," in IEEE Spectrum, vol. 34, No. 2, pp. 23-29, Feb. 1997, doi: 10.1109/6.570823. (Year: 1997) (Year: 1997).*

*Primary Examiner* — Neha Patel
*Assistant Examiner* — Jahed Ali
(74) *Attorney, Agent, or Firm* — Rowand LLP

(57) ABSTRACT

A computer system for provisioning a data transfer method is disclosed, comprising a processor, and a communications module and a memory coupled to the processor. The memory stores instructions that, when executed by the processor, cause the computer system to: receive a provisioning request for a data transfer method; send, to a server associated with the data transfer method, a request, based on the provisioning request, for assignment of a data transfer identifier; receive, from the server, the data transfer identifier responsive to the request for assignment of the data transfer identifier; obtain a data transfer token corresponding to the data transfer identifier by: sending, to a token service provider, a request for the token comprising the data transfer identifier; receiving, from the token service provider, a data transfer token in response to the request for the token; and, send a reply to the provisioning request comprising the token.

16 Claims, 6 Drawing Sheets

(51) Int. Cl.
  *G06F 9/54* (2006.01)
  *G06Q 20/10* (2012.01)
  *H04L 67/00* (2022.01)
  *G06Q 20/32* (2012.01)
  *H04L 67/1097* (2022.01)

(52) U.S. Cl.
  CPC ....... *G06Q 20/3821* (2013.01); *G06Q 20/401* (2013.01); *H04L 67/34* (2013.01); *G06Q 2220/00* (2013.01); *H04L 67/1097* (2013.01)

(56) References Cited

U.S. PATENT DOCUMENTS

| | | | |
|---|---|---|---|
| 9,082,119 B2* | 7/2015 | Ortiz | G06Q 20/3278 |
| 10,318,946 B2* | 6/2019 | Mills | G06Q 20/227 |
| 10,417,706 B1* | 9/2019 | Simon | G06Q 40/025 |
| 10,460,312 B1* | 10/2019 | Kurani | G06Q 20/36 |
| 10,839,376 B1* | 11/2020 | Kurani | G06Q 20/1085 |
| 10,984,404 B2* | 4/2021 | Nack | G06Q 20/3274 |
| 11,188,919 B1* | 11/2021 | Ho | G06Q 20/382 |
| 2005/0102188 A1* | 5/2005 | Hutchison | G06Q 20/02 705/39 |
| 2005/0165684 A1* | 7/2005 | Jensen | G06Q 20/00 705/44 |
| 2008/0058014 A1* | 3/2008 | Khan | G07F 7/1008 455/558 |
| 2008/0223918 A1* | 9/2008 | Williams | G06Q 20/342 235/379 |
| 2009/0254440 A1* | 10/2009 | Pharris | G06Q 20/102 705/17 |
| 2010/0138344 A1* | 6/2010 | Wong | G06Q 20/10 705/44 |
| 2011/0087595 A1* | 4/2011 | Sabella | G06Q 20/20 705/44 |
| 2012/0078735 A1* | 3/2012 | Bauer | G06Q 20/36 705/16 |
| 2013/0124349 A1* | 5/2013 | Khan | G06Q 20/36 705/21 |
| 2013/0179199 A1* | 7/2013 | Ziskind | G06F 21/10 705/5 |
| 2013/0346222 A1* | 12/2013 | Ran | G06Q 20/204 705/17 |
| 2014/0070001 A1* | 3/2014 | Sanchez | G06Q 40/025 235/380 |
| 2014/0108261 A1* | 4/2014 | Priest | G06Q 20/202 705/67 |
| 2014/0108263 A1* | 4/2014 | Ortiz | G06Q 20/3278 705/71 |
| 2014/0279552 A1* | 9/2014 | Ortiz | G06Q 20/3278 705/65 |
| 2015/0032627 A1* | 1/2015 | Dill | G06Q 20/385 705/44 |
| 2015/0302383 A1* | 10/2015 | Mills | G06Q 20/227 705/39 |
| 2015/0310425 A1* | 10/2015 | Cacioppo | G06Q 20/385 705/64 |
| 2016/0092872 A1* | 3/2016 | Prakash | G06Q 20/36 705/65 |
| 2016/0314456 A1* | 10/2016 | Douglas | G06Q 20/363 |
| 2016/0364795 A1* | 12/2016 | Bhagat | G06Q 20/202 |
| 2017/0068952 A1* | 3/2017 | Brockmann | G06Q 20/3672 |
| 2017/0109745 A1* | 4/2017 | Al-Bedaiwi | H04W 4/80 |
| 2017/0161735 A1* | 6/2017 | Ortiz | G06Q 20/3278 |
| 2017/0193503 A1* | 7/2017 | Oppenheim | G06Q 20/401 |
| 2017/0373852 A1* | 12/2017 | Cassin | G06Q 20/14 |
| 2018/0137508 A1* | 5/2018 | Shah | G06Q 20/02 |
| 2019/0087809 A1* | 3/2019 | Bloy | G06Q 20/3223 |
| 2019/0164184 A1* | 5/2019 | Walz | H04N 1/32144 |
| 2020/0279258 A1* | 9/2020 | Agrawal | H04L 9/0631 |
| 2020/0311246 A1* | 10/2020 | Sharma | G06Q 20/32 |
| 2020/0402049 A1* | 12/2020 | Pi Farias | G06Q 20/40 |
| 2021/0344672 A1* | 11/2021 | Drechsler | G06Q 20/3226 |

\* cited by examiner

SYSTEM AND METHOD FOR PROVISIONING A DATA TRANSFER APPLICATION

TECHNICAL FIELD

The present application relates to data transfers, and, more particularly, to configuration of data transfer applications.

BACKGROUND

Electronic devices may be utilized to perform various types of data transfers. In some cases, dedicated applications may be provided that allow performance of data transfers. Such data transfer applications may support various data transfer methods.

It may be necessary to provision a particular data transfer method in a data transfer application before that data transfer application can be used for performing data transfers using that method. However, existing techniques for provisioning data transfer applications can incur long time delays.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
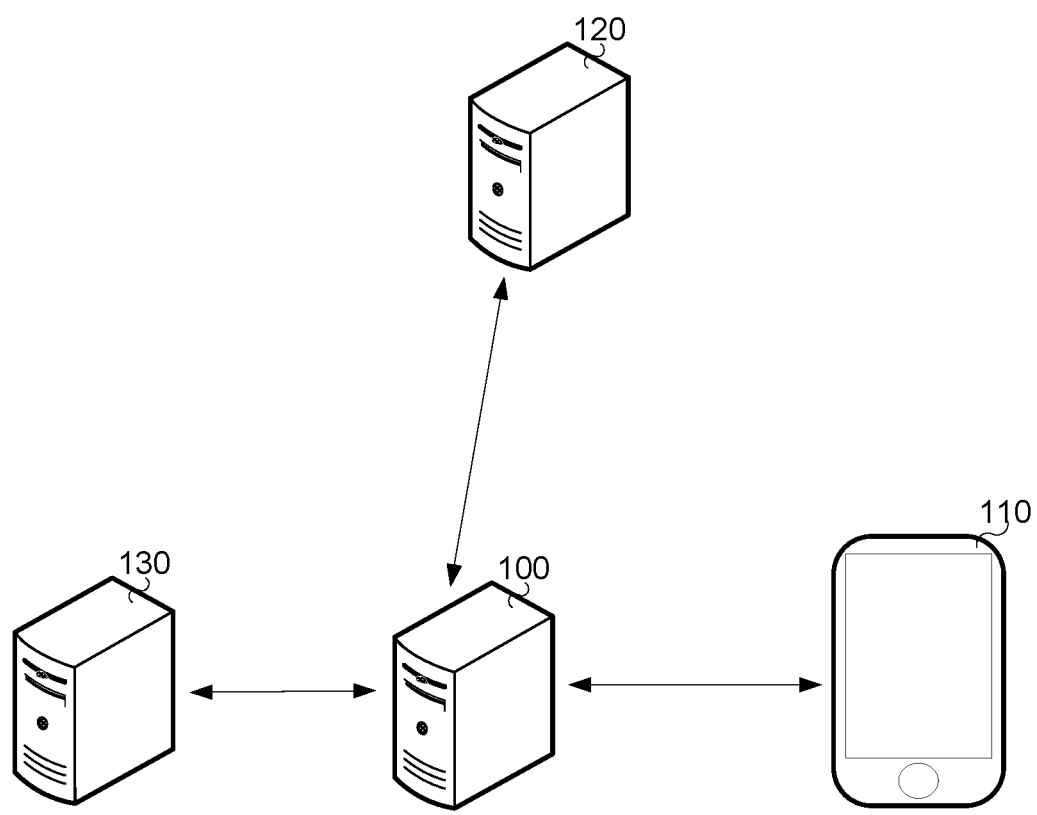
FIG. 1 is a schematic operation diagram illustrating an operating environment of an example embodiment.

In one aspect, there is provided a computer system comprising: a processor; a communications module, coupled to the processor, for communicating with one or more computer networks; and a memory coupled to the processor and storing instructions that, when executed by the processor, cause the computer system to: receive, using the communications module, a provisioning request for a data transfer method; send, to a server associated with the data transfer method using the communications module, a request, based on the provisioning request, for assignment of a data transfer identifier; receive, from the server using the communications module, the data transfer identifier responsive to the request for assignment of the data transfer identifier; obtain a data transfer token corresponding to the data transfer identifier by: sending, to a token service provider using the communications module, a request for the data transfer token comprising the data transfer identifier; receiving, from the token service provider using the communications module, the data transfer token in response to the request for the data transfer token; and, send, using the communication module, a reply to the provisioning request comprising the data transfer token.

In another aspect, there is provided a computer-implemented method comprising: receiving, using a communications module, a request to provision a data transfer method; sending, to a server associated with the data transfer method using the communications module, a request, based on the request to provision the data transfer method, for assignment of a data transfer identifier; receiving, from the server using the communications module, the data transfer identifier responsive to the request for assignment of the data transfer identifier; obtaining a data transfer token corresponding to the data transfer identifier by: sending, to a token service provider using the communications module, a request for the data transfer token comprising the data transfer identifier; receiving, from the token service provider using the communications module, the data transfer token in response to the request for the data transfer token; and, sending, using the communication module, a reply to the request to provision the data transfer method comprising the data transfer token.

In another aspect, there is provided a computer system comprising: a processor; a communications module, coupled to the processor, for communicating with one or more computer networks; and a memory coupled to the processor and storing instructions that, when executed by the processor, cause the computer system to: receive, using the communications module, a request for assignment of a data transfer identifier for a data transfer method, wherein the data transfer method is a payment method corresponding to a credit account; send, to a server using the communications module, a credit request comprising at least one of a request to originate the credit account and a request for adjudicating a credit limit, if any, of the credit account; receive, from the server using the communications module, a response to the credit request; upon determining that the response to the credit request comprises an indication of at least one of a positive origination decision and a positive adjudication decision, cause a primary account number (PAN) to be assigned to the credit account; and, send, in response to the request for assignment of the data transfer identifier, a response indicating a data transfer identifier including the PAN.

It may be desirable to minimize or limit human intervention necessary to provision a data transfer method. Minimizing or limiting human intervention in provisioning a data transfer method may reduce cost and/or errors in provisioning. Additionally or alternatively, it may be desirable to minimize latency in provisioning data transfer methods. In a specific example, if human intervention and latency are minimized, then a data transfer method can be provisioned in "real time" or near real time. Conveniently, provisioning of a data transfer method in real time or near real time may offer benefits in certain scenarios. In one example, data transfers may correspond to payments with data transfer methods corresponding to particular payment methods. Data transfers corresponding to payments may be performed using a data transfer application such as a payment or "mobile wallet" application. Some conventional methods of provisioning such payment applications can take about 24 hours to provision a particular payment method for use in an application. By contrast, real time or near real time provisioning of a payment method may allow making an urgent payment using that payment method without such a lengthy cycle time. For example, if the payment method is a store credit card, real time or near real time provisioning may allow a new cardholder to use that payment method in store right after signing-up for the store's credit card. Notably, a retailer may require such real time or near real time provisioning in order to satisfy business requirements.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a data transfer application provisioning system 100 is in communication with an electronic device 110, a data transfer method configuration system 120, and a token service provider system 130.

As further described below, the data transfer application provisioning system 100 is accessed by computing devices to provision software applications stored and/or executing on those devices for performing data transfers using particular data transfer methods associated with the data transfer application provisioning system 100. For example, electronic device 110 may access the data transfer application provisioning system 100 to provision a data transfer application of the electronic device 110 with one or more particular data transfer methods associated with the data transfer application provisioning system 100. As described below, the data transfer application provisioning system 100 cooperates with the data transfer method configuration system 120 and the token service provider system 130 in order to service requests such as, for example, from electronic device 110, for provisioning of a data transfer method associated with the data transfer application provisioning system 100.

The data transfer application provisioning system 100, the data transfer method configuration system 120 and the token service provider system 130 are computer systems. Computer systems may be, for example, a mainframe computer, a minicomputer, or the like. Computer systems may include one or more computing devices. For example, a computer system may include multiple computing devices such as, for example, database servers, compute servers, and the like. The multiple computing devices may be in communication using a computer network. For example, computing devices may communicate using a local-area network (LAN). In some embodiments, computer systems may include multiple computing devices organized in a tiered arrangement. For example, a computer system may include middle-tier and back-end computing devices. In some embodiments, a computer system may be a cluster formed of a plurality of interoperating computing devices.

The electronic device 110 is also a computing device. In some embodiments, the electronic device 110 may be a portable electronic device. For example, the electronic device 110 may, as illustrated, be a smartphone. However, the electronic device 110 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, the electronic device 110 may be associated with one or more users. For instance, a user may operate the electronic device 110, and may do so to cause the electronic devices to perform one or more operations consistent with the disclosed embodiments. In some embodiments, the electronic device 110 may include a smart card, chip card, integrated circuit card (ICC), and/or other card having an embedded integrated circuit.

As noted above, the electronic device 110 includes a data transfer application. A data transfer application may be particular to a particular domain or application. For example, a data transfer application may be a loyalty program application for making data transfers corresponding to one or more particular loyalty programs. In another example, a data transfer application may be a financial application for making data transfers corresponding to financial data. More particularly, a data transfer application may, for example, be a payment application for making data transfers corresponding to particular payment methods. For example, a data transfer application may be a mobile payment application such as in various scenarios where the electronic device 110 is a mobile device. In yet another example, a data transfer application may support making data transfers corresponding to a variety of domains. For example, in some embodiments, a data transfer application may make data transfers corresponding to both payment methods and loyalty programs.

In some embodiments, the electronic device 110 may perform data transfers, such as by way of the data transfer application, with devices such as, for example, point-of-sale (POS) terminals (not illustrated), also referred to as payment terminals. In an example, a data transfer between the electronic device 110 and a terminal may be made to process a payment to a party, such as a merchant, associated with the terminal. For example, the electronic device 110 may transmit a secure token or other identifier to the terminal during a transaction. A POS terminal uses this token in order to determine whether a transaction is to be approved or declined. The secure token or identifier may be transmitted over a short-range communication system, such as a near field communication (NFC) interface. As further described below, the electronic device 110 may be provisioned to be able send such a secure token during provisioning of a data transfer method.

Figure 2:
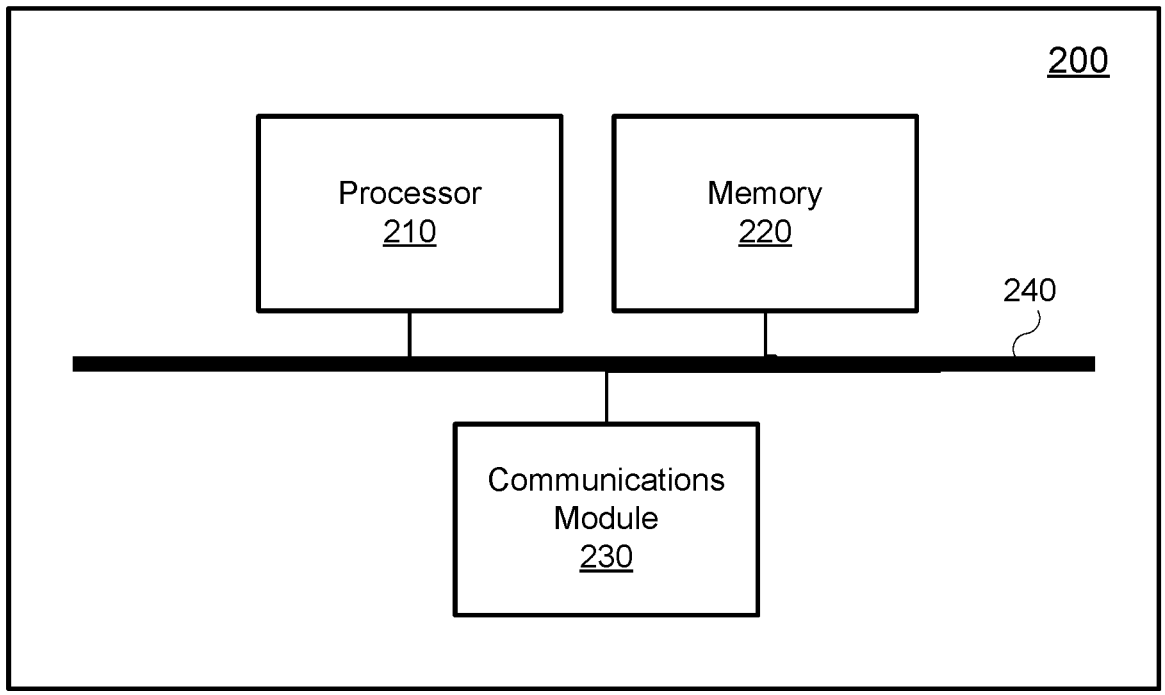
FIG. 2 is a high-level operation diagram of an example computing device.

FIG. 2 is a high-level operation diagram of an example computing device 200. In some embodiments, example computing device 200 may be exemplary of one or more of the data transfer application provisioning system 100, the electronic device 110, the data transfer method configuration system 120 and the token service provider system 130. As will be discussed in greater detail below, each of the data transfer application provisioning system 100, the electronic device 110, the data transfer method configuration system 120 and the token service provider system 130 includes software that adapts it to perform a particular function. More particularly, software of each of the data transfer application provisioning system 100, the electronic device 110, the data transfer method configuration system 120 and the token service provider system 130 cooperates, with communication between the data transfer application provisioning system 100, the electronic device 110, the data transfer method configuration system 120 and the token service provider system 130 via some manner of computer network, in order to provision the electronic device 110 for performing one or more data transfers using a particular data transfer method.

The example computing device 200 includes a variety of modules. For example, as illustrated, the example computing device 200 may include a processor 210, a memory 220, and a communications module 230. As illustrated, the foregoing example modules of the example computing device 200 are in communication over a bus 240.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. Contactless payments may be made using NFC. In some embodiments, all or a portion of the communications module 230 may be integrated into a component of the example computing device 200. For example, the communications module 230 may be integrated into a communications chipset.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
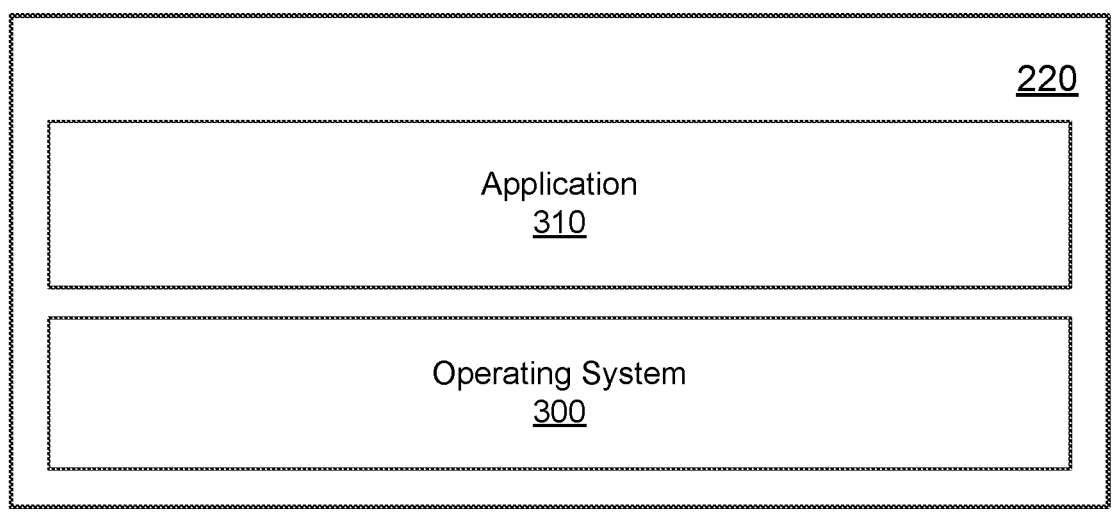
FIG. 3 depicts a simplified software organization exemplary of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple OSX™ or the like.

The application 310 adapts the example computing device 200, in combination with the operating system 300, to operate as a device to a particular function. For example, application 310 may cooperate with the operating system 300 to adapt a suitable embodiment of the example computing device 200 to operate as the data transfer application provisioning system 100, the electronic device 110, the data transfer method configuration system 120, or the token service provider system 130.

The operation each of the data transfer application provisioning system 100, the electronic device 110, the data transfer method configuration system 120, and the token service provider system 130 will be described below with reference to FIGS. 4-6.

The data transfer application provisioning system 100 is operable to provision data transfer applications such as, for example, the data transfer application of the electronic device 110, so that those data transfer applications can be used to perform data transfers according a selected one or more of the data transfer methods associated with the data transfer application provisioning system 100. As further described below, responsive to a provisioning request, the data transfer application provisioning system 100 provides data to the data transfer application for performing a data transfer according to a particular data transfer method, namely the method for which provisioning is sought.

The operation of the data transfer application provisioning system 100 is described with reference to the flowchart of FIG. 4. Operations 410 and onward are performed by one or more processors of a computing device, such as for example the processor 210 of a suitably configured instance of the example computing device 200, executing software such as, for example, a suitable instance of the application 310.

At the operation 410, a processor receives a provisioning request for a data transfer method. The provisioning request may be received from a network. The provisioning request may be received by way of a communications module. For example, a provisioning request may be received by way of the communications module 230.

The received provisioning request may have been sent by a device that includes a data transfer application. For example, a request for provisioning of a data transfer method may be received from the electronic device 110, sent so that its data transfer application can be provisioned to perform data transfers using that data transfer method indicated in the request.

The provisioning request may contain data or metadata related to a particular data transfer method. For example, the data transfer application provisioning system 100 may be associated with one or more data transfer methods and the provisioning request may contain data or metadata indicating and/or otherwise related to one of the associated data transfer methods. In some embodiments, a provisioning request may relate to more than one data transfer method. For example, a provisioning request may relate to more than one of the one or more data transfer methods associated with the data transfer application provisioning system 100.

In some embodiments, data or metadata included in a provisioning request may include personal information of a user. For example, the personal information may include information that identifies a user associated with a device being provisioned such as, for example the electronic device 110. Identifying information may, for example, include a user's actual name, a username, a password, or an identifying number. Identifying numbers may be, for example, a customer number or a government identification number. In a specific example, a government identification number such as, for example, a U.S. Social Security Number (SSN) or a Canadian Social Insurance Number (SIN) may be included in the identifying information. In some embodiments, identifying information may be validated. For example, only provisioning requests with valid identifying information may be processed.

The provisioning request may be received in a variety of forms. In some embodiments, the provisioning request may be received as a message. The provisioning request may be made by way of remote procedure calls (RPC). For example, a provisioning request may be received as a remote procedure call according to the Common Object Request Broker Architecture (CORBA) standard. In some embodiments, software executing at the data transfer application provisioning system 100 may include a web server. In some such embodiments, a provisioning request may be received according to a web-based protocol. For example, in some embodiments, provisioning functionality may be exposed by way of a web-based application. In one example, such a web-based application may be accessed using a web browser executing at the electronic device 110. Such a web-based application may then be used to receive information to provision a data transfer application of the electronic device 110. In some embodiments, such a web-based application may be accessed using a branded application executing at the electronic device 110. A branded application associated with one or more particular data transfer methods may provide functionality allowing access to a web-based data transfer method provisioning application provided by the data transfer application provisioning system 100. In a specific example, a branded application may host a web browser widget configured to access the web-based data transfer method provisioning application of the data transfer application provisioning system 100.

In a particular example, the data transfer application provisioning system 100 may be operated by an entity such as, for example, a retailer, providing a branded payment account. The electronic device 110 may correspond to a device of a user such as, for example, a shopper interested in signing up for such an account. The user may use the electronic device 110 to access a web-based application provided by the retailer such as by visiting a web address associated with the web-based application by, for example, keying in a uniform resource locator (URL) associated with the web-based application as may, for example, be provided by a retailer on advertising materials or at point of sale. Additionally or alternatively, a retailer may provide some machine-readable encoding of such a URL such as, for example, a quick-response (QR) code usable to access the web-based application. The data transfer method configuration system 120 may be operated by an issuer of the payment account such as, for example, the issuer of a co-branded payment card such as where, for example, a financial institution manages some or all of the back-office operations associated with the payment account. In manners further described below, such an arrangement may allow the customer to open an account in real time or near real time such as, for example, prior to visiting a check-out counter. Conveniently, in this way, a customer may make payments using the electronic device 110 without undue delay following such real time or near real time provisioning and, in particular, real time or near real time provisioning. For example, such an arrangement may allow a customer to make a payment using the electronic device 110 in a store after they sign-up or provision their device for the branded payment account at some point during their visit to the store.

In some embodiments, the data transfer application provisioning system 100 may provide a web services application programming interface (API). A web services API may be provided according to one or more well-known protocols to allow for interoperability. For example, a web services API may be a "RESTful" API following a REpresentational State Transfer (REST) model. In another example, a web services API may follow the SOAP protocol.

In some embodiments, the data transfer application provisioning system 100 may follow a multi-tiered model. For example, it may be that provisioning requests are received by way of a web-based application such as, for example, as described above, which then, in turn translates those requests into suitable calls to a web services API in manners known to persons of ordinary skill.

Following receipt of a provisioning request, control flow proceeds to an operation 420. At the operation 420, a data transfer identifier is obtained.

The data transfer identifier may be obtained from a remote system. For example, the data transfer application provisioning system 100 may use a network to transmit a request for a data transfer identifier to a remote system. Such a request may be sent by way of a communications module. For example, a request for a data transfer identifier may be sent by way of the communications module 230. The remote system to which the request for a data transfer identifier may be sent may be the data transfer method configuration system 120.

Notably, the server from which a data transfer identifier is requested may correspond to the particular data transfer method for which provisioning is requested. For example, consider the example of a data transfer method where data transfers made using that method correspond to payments. Such a data transfer method may, for example, correspond to a credit account, a debit account, or a charge account with the data transfer network that processes data transfers made using that data transfer method being a payment network. In some such embodiments, the server from which the data transfer identifier is requested may be associated with the payment method. For example, the data transfer identifier may correspond to an issuer of the credit, debit or charge account. In a specific example, the data transfer method configuration system 120 may be provided by such an issuer. In another example, where the data transfer method for which provisioning is requested corresponds to a loyalty program, the server from which the data transfer identifier is requested may be a server of the loyalty program provider.

A data transfer identifier request may include data or metadata indicating and/or otherwise related to the data transfer method. For example, a request for a data transfer identifier may include some or all of the information received with the provisioning request. Additionally or alternatively, the request for a data transfer identifier may include information retrieved or otherwise obtained based on some or all of the information received with the provisioning request. For example, the data transfer application provisioning system 100 may use information provided with the provisioning request to perform a database look-up for information which may then be included in the request for a data transfer identifier.

The requested data transfer identifier may take a variety of forms or formats. in some embodiments, the form of the requested data transfer identifier may depend on the particular data transfer method. Where the data transfer method for which provisioning has been requested is a payment method, the requested data transfer identifier may be an identifier for a payment account. For example, the requested data transfer identifier may be a primary account number (PAN). In a specific example, the requested data transfer identifier may be or may include a PAN where the payment method corresponds to a credit, debit or charge account such as described above. In another example, where the data transfer method for which provisioning has been requested corresponds to a loyalty program, the request may be for a loyalty account number.

Akin to the above described receipt of a request for provisioning, the transmission of the data transfer identifier request may also take a variety of forms. For example, the data transfer identifier request may be sent as a message. In another example, the data transfer identifier request may be made by way of RPC. In another example, the data transfer identifier request may be made using a web services API call. In a specific example, the request for assignment of a data transfer identifier may be made using a web services API hosted by a remote server. For example, such a web service may be provided by the data transfer method configuration system 120. A request for a data transfer identifier may be sent to such a remote server by making a call to a web services API hosted thereby. Notably, there is no requirement that the request for a data transfer identifier and the provisioning request are sent and received using the same method or protocol. Instead, the form of the request for a data transfer identifier may be in a particular format correspond to the remote server such as, for example, the protocol of a provided web service.

As described further below, the data transfer method configuration system 120 may undertake various processing in order to provide a data transfer identifier response to the request. In one example, if the data transfer method for which provisioning is requested corresponds to a loyalty program, then the data transfer method configuration system 120 may assign a loyalty program number or may perform a look-up to determine an already assigned loyalty program account. In another example, where the data transfer method is a payment method, validation may be undertaken to ensure there are available funds before providing a data transfer identifier. Alternatively, where the payment method corresponds to a credit account such as, for example a credit or charge account, responsive to the request for assignment of a data transfer identifier, it may be that the remote server initiates origination and/or adjudication of credit for a user.

Responsive to the request for a data transfer identifier, a response may be received by the data transfer application provisioning system 100 containing the requested data transfer identifier. For example, a data transfer identifier may be received from the data transfer method configuration system 120. The received data transfer identifier may be processed in some manner. For example, the identifier may be validated.

Next, following the operation 420, once a data transfer identifier is obtained, control flow proceeds to an operation 430 where a data transfer token corresponding to the data transfer identifier is obtained.

By way of overview, a data transfer identifier may be sensitive information and may require handling in a secure manner. Accordingly, it may be necessary to obtain a token corresponding to the data transfer identifier that will be used in performing data transfers according to the associate data transfer method, such as to avoid sending the data transfer identifier to the system requesting provisioning of the data transfer method.

A data transfer token corresponding to the data transfer identifier may be obtained from a remote system. For example, the data transfer application provisioning system 100 may use a network to transmit a request for a data transfer token. Such a request may be sent by way of a communications module. For example, a request for a data transfer token may be sent by way of the communications module 230. The request for a data transfer identifier may be sent to the token service provider system 130.

The server to which the data transfer token request is sent may be provided by the same entity as provides the data transfer application provisioning system 100. In another example, that server may be provided by the entity operating the data transfer method configuration system 120. In yet another example, the server may be provided by another entity. For example, where the data transfer method corresponds to a payment method, the request may be sent to a service provided by an entity associated with the payment method. In a specific example, where the data transfer method corresponds to a credit or debit card, a token service may be provided by a data network associated with the card. For example, if the card is Visa™ branded, a request may be sent to the Visa Token Service. For example, it could be that the token service provider system 130 is operated by any one of the aforementioned entities.

A data transfer token request may include the data transfer identifier obtained at the operation 420. Alternatively, only a portion of the data transfer identifier may be provided. Additionally or alternatively, some value based on the data transfer identifier may be transmitted. For example, the data transfer identifier may be provided in the data transfer request in an obfuscated form.

The transmission of the data transfer token request may also take a variety of forms. For example, the data transfer token request may be sent as a message. In another example, the data transfer token request may be made by way of RPC. In another example, the data transfer token request may be made using a web services API call. In particular, the request for assignment of a data transfer token may be made using a web services API hosted by a remote server. For example, such a web service may be provided by the token service provider system 130. A request for a data transfer token may be sent to such a remote server by making a call to a web services API hosted thereby. Notably, there is no requirement that the request for a data transfer token is sent using the same format as any of the other aforementioned types of requests. Instead, the form of the request for a data transfer token may correspond to the remote server such as, for example, the protocol of a web service provided by a token server provider.

Responsive to the request for a data transfer token, a data transfer token may be received from a remote server. For example, a data transfer token may be received from the token service provider system 130.

The received data transfer token may be a single-use token. In another example, the received data transfer token may be a multi-use token.

For example, where the data transfer identifier is a PAN as described above, the received data transfer token may be or may include a tokenized PAN or a cryptographic PAN.

In another example, where the data transfer identifier corresponds to a loyalty program account, the received data transfer token may follow a format particular to the particular loyalty program. In a particular example, the data transfer token may correspond to the number of a particular virtual loyalty card associated with that account.

Once a data transfer token has been received, control flow proceeds to an operation 440.

At the operation 440, a reply to the provisioning request received at the operation 410 is provided. The response to the provisioning request includes data required for provisioning the requesting device to perform a data transfer using the data transfer method associated with the provisioning request. For example, the response may include the data transfer token obtained at the operation 430.

A reply to the provisioning request may be provided in a form corresponding to the form of the request received at the operation 410. For example, where the received request for provisioning the data transfer method was received via a message, a reply to the provisioning request may be provided as another message sent to the requestor. For example, a reply message could be sent to the electronic device 110. In another example, where provisioning was requested using RPC, the response could be provided as a result or an output of the particular remote procedure call. Additionally or alternatively, a corresponding procedure call—e.g. a "callback"—could be made to an API provided by the requestor. In another example, where the provisioning request was made via a web services API, a response may be sent in response to the web services call or using a callback.

As stated above, a remote server may undertake various processing in order to provide a data transfer identifier in response to a request for data transfer identifier.

The operation of the data transfer method configuration system 120 is described with reference to FIG. 5, a flowchart depicting example operations performed by the data transfer method configuration system 120. Operations 510 and onward are performed by one or more processors of a computing device, such as for example the processor 210 of a suitably instance of the example computing device 200, executing software such as, for example, a suitable instance of the application 310.

At the operation 510, a processor receives a request for a data transfer identifier. The received request may include various information as described above in the description of the operation 420 (FIG. 4). Additionally, a received request may be sent in a variety of manners such as using messages, RPC, a web services API, etc. as described above in the description of the operation 420.

Following receipt of the request for a data transfer identifier, control flow proceeds to an operation 520.

At the operation 520, the processor performs processing in order to determine whether to allocate a data transfer identifier.

For example, as discussed above, where the data transfer method for which a data transfer identifier is requested (and for which a corresponding request for provisioning received at the data transfer application provisioning system 100 may have resulted in the transmission of the request for a data transfer identifier being handled at the operation 520) corresponds to a payment method for a credit account, credit may be originated and/or adjudicated by the data transfer method configuration system 120. More particularly, the data transfer method configuration system 120 may send a request to a server responsible for automatically originating and/or adjudicating credit. For example, the server may be responsible for determining whether credit should be originated and/or adjudicating credit limits (if any) if credit is originated. The server may perform this automatically make credit origination and adjudication decisions without human intervention according to one or more inputs such as for example, income, credit scores, etc. and assessed according to various business rules and/or scorecards. The server may make the aforementioned origination and/or adjudication decisions in real time or near real time. Conveniently, in this way, credit may be originated and/or adjudicated within the context of real time or near real time provisioning of a data transfer method corresponding to a payment method. Accordingly, in some such scenarios, at the operation 520, a credit request may be sent to another remote server that includes one or both of a request to automatically originate a credit account and a request for automatically adjudicating a credit limit (if any) of a credit account. Such a request may be sent via a computer network. For example, such a request may be sent using a communications module such as the communications module 230.

If a determination is made that a data transfer identifier should be allocated, flow control proceeds to an operation 540. Alternatively, if it is determined that a data transfer identifier should not be allocated, control flow proceeds to an operation 530 where the request is then refused.

Returning to the example of credit adjudication and origination, for example, control flow may proceed to the operation 530 is there is a negative origination/adjudication decision, whereas control flow may instead proceed to the operation 540 if there is a positive origination decision and/or a positive adjudication decision. In a specific example, if a response if a request was sent to another server to automatically adjudicate and/or originate credit, a determination of whether to proceed to the operation 530 or the operation 540 may be made based on to a reply to the origination/adjudication request received from the remote server.

At the operation 530, the request for a data transfer identifier is refused. In some embodiments, the refusal may be active. For example, an active refusal may involve sending a message to the requestor containing an indication of refusal. In some embodiments, a refusal may include an explanation of a reason for refusal. For example, where the data transfer method for which a data transfer identifier is sought is a payment method and, in particular, a credit method, the refusal explanation may relate to an origination/adjudication decision. Alternatively, refusal may be passive. For example, a request for a data transfer identifier received as a message may be passively refused by not sending any reply message.

If instead control flow proceeds to the operation 540, then, at the operation 540, a data transfer identifier is assigned.

In some embodiments, a data transfer identifier may be assigned by the data transfer method configuration system 120. For example, the data transfer method configuration system 120 may generate an identifier. In other embodiments, another server may be responsible for assigning data transfer identifiers. For example, where the data transfer identifier is to correspond to a payment card, an identifier such as, for example, a PAN, may be assigned by a card information server.

Where the data transfer identifier is to be assigned by a remote server such as, for example, a card information server, a request may be sent to the remote server and a reply received thereto may be received. Such a request and reply may take a variety of forms such as those considered above—e.g. using a message, RPC, a web services API, etc. Notably one or both of the request or reply may be sent via a computer network. A request may be sent to and a reply received from a server via a network using a communications module. In a specific example, a request may be sent to a card info server or received therefrom via a computer network such as, for example, by way of communications module 230.

Following assignment of a data transfer identifier at the operation 540, control flow proceeds to an operation 550.

At the operation 550, a reply to the data transfer identifier request received at the operation 510 is provided. The reply to the data transfer identifier request includes the assigned data transfer identifier.

A reply to the data transfer identifier request may be provided in a form corresponding to the form of the request received at the operation 510. For example, where the received request for a data transfer identifier was received via a message, a reply to the data transfer identifier request may be provided as another message sent to the requestor. For example, a reply message could be sent to the data transfer application provisioning system 100. In another example, where provisioning was requested using RPC, the response could be provided as a result or an output of the particular remote procedure call. Additionally or alternatively, a corresponding procedure call—e.g. a "callback"—could be made to an API provided by the requestor. In another example, where the provisioning request was made via a web services API, a response may be sent in response to the web services call or using a callback.

As discussed above, the data transfer application of the electronic device 110, the data transfer application provisioning system 100, the data transfer method configuration system 120 and the token service provider system 130 interact in order to provision the data transfer application for selected payment methods. FIG. 6 illustrates how such systems may interoperate in some embodiments. In particular, FIG. 6 is a sequence diagram, similar to a Unified Modelling Language (UML) sequence diagram, that shows how such systems may interoperate in some embodiments, and, in particular, depicting messages exchanged between such systems.

As illustrated, a data transfer application 600 is in communication with a data transfer application provisioning system 610. The data transfer application provisioning system 610 is in communication with a data transfer method configuration system 620 and a token service provider system 630.

The illustrated systems may correspond to the systems of FIG. 1. In particular, the data transfer application 600 may correspond to the data transfer application of the electronic device 110, the data transfer application provisioning system 610 may correspond to the data transfer application provisioning system 100, the data transfer method configuration system 620 may correspond to the data transfer method configuration system 120, and the token service provider system 630 may correspond to the token service provider system 130.

In the following description of FIG. 6, discussion is made of various messages being sent and received via a computer network. In some embodiments, the exchanged messages may be implemented as messages. However, in other embodiments, some or all of the illustrated messages may not correspond to messages per se when sent over the computer network but may instead be implemented using techniques such as for example RPC and/or web services APIs as described above. For example, it may be that the various message pairs illustrated in FIG. 6—e.g. messages 652 and 654—correspond, respectively, to an RPC or a web service API call and a reply or callback in response to that call.

Notably, each of the various messages 650-660 may be transmitted and handled by each of the actors 600-630 in real time or near real time, including sending any other messages responsive thereto as further described below. Conveniently, in this, way a data transfer method may be provisioned in real time or near real time.

At the beginning of the illustrated sequence, the data transfer application 600 sends a message 650 to the data transfer application provisioning system 610. This may be a provisioning request for a data transfer method. For example, the message 650 may correspond to a provisioning request for a data transfer method such as is received by the data transfer application provisioning system 100 at the operation 410 (FIG. 4).

Next, responsive to the message 650, the data transfer application provisioning system 610 sends a message 652 to the data transfer method configuration system 620. This may be a request for a data transfer identifier. For example, the message 652 may correspond to a request for a data transfer identifier such as may be sent by the data transfer application provisioning system 100 at the operation 420 (FIG. 4). Further, the message 652 may, additionally or alternatively, correspond to a request for a data transfer identifier such as may be received by the data transfer method configuration system 120 at the operation 510 (FIG. 5).

Next, responsive to the message 652, the data transfer method configuration system 620 sends a message 654 to the data transfer application provisioning system 610 in reply. The message 654 may provide a data transfer identifier. In a specific example, the message 654 may correspond to a reply to a request for a data transfer identifier such as may be received by the data transfer application provisioning system 100 at the operation 420. Additionally or alternatively, the message 654 may correspond to a reply to a request for a data transfer identifier such as may be sent by the data transfer method configuration system 120 at the operation 550 in response to a corresponding request sent at the operation 550 (FIG. 5).

Next, the data transfer application provisioning system 610 sends a message 656 to the token service provider system 630. For example, the message 656 may be a request for a data transfer token corresponding to a data transfer identifier such as may have been received in message 654. In a specific example, the message 656 may correspond to a request for a data transfer token such as may be sent by the data transfer application provisioning system 100 at the operation 430 (FIG. 4).

Next, responsive to the message 656, the token service provider system 630 sends a message 658 to the data transfer application provisioning system 610 in reply. For example, the message 658 may provide a token corresponding to a data transfer identifier provided to the token service provider system 630 by way of the message 656. In a specific example, the message 658 may correspond to a response to a request for a data transfer such as may be received by the data transfer application provisioning system 100 at the operation 430 in reply to a corresponding request previously sent at the operation 430.

Then, responsive to the message 658, the data transfer application provisioning system 610 sends a message 660 to the data transfer application 600 in reply to the message 650. The message 660 may provide information for provisioning a data transfer method. In other words, the message 660 may be a reply to the request for provisioning of a data transfer method of message 650. The message 658 may include a token received by the data transfer application provisioning system 610 in the message 658. The message 660 may correspond to a reply to a provisioning request such as may be sent by the data transfer application provisioning system 100 at the operation 440 (FIG. 4).

Figure 7:
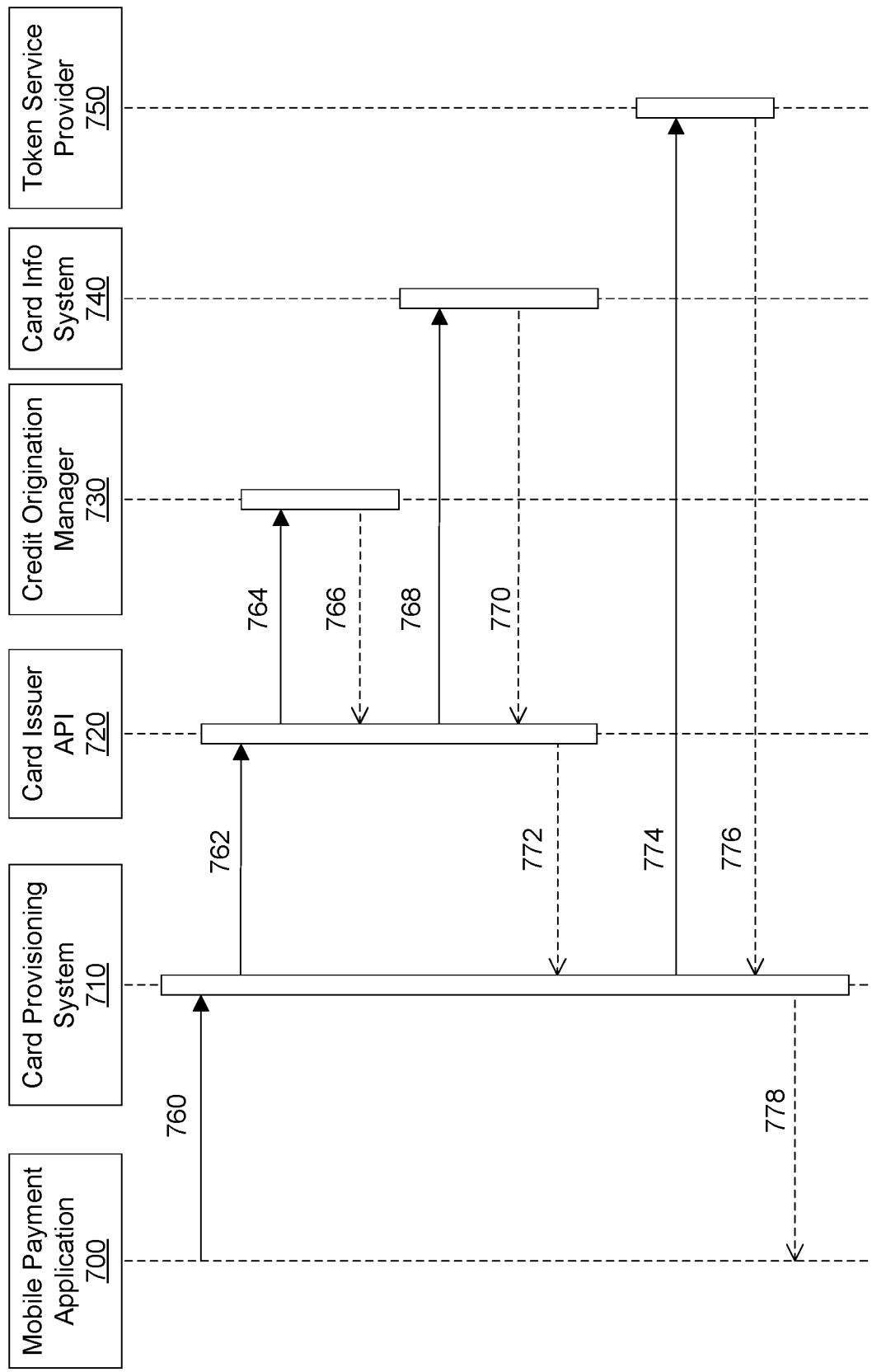
FIG. 7 is a sequence diagram depicting data transfers between computer systems, exemplary of an embodiment.

Turning now to FIG. 7, the exchange of messages in some embodiments related to provisioning of data transfer methods corresponding to payments is illustrated by way another sequence diagram.

As illustrated, a mobile payment application 700 executing at a computer system is in communication with a card provisioning system 710. The card provisioning system 710 is in communication with a card issuer API system 720 and a token service provider system 750. The card issuer API system 720 is in communication with a credit origination manager system 730 and a card information system 740.

Figure 6:
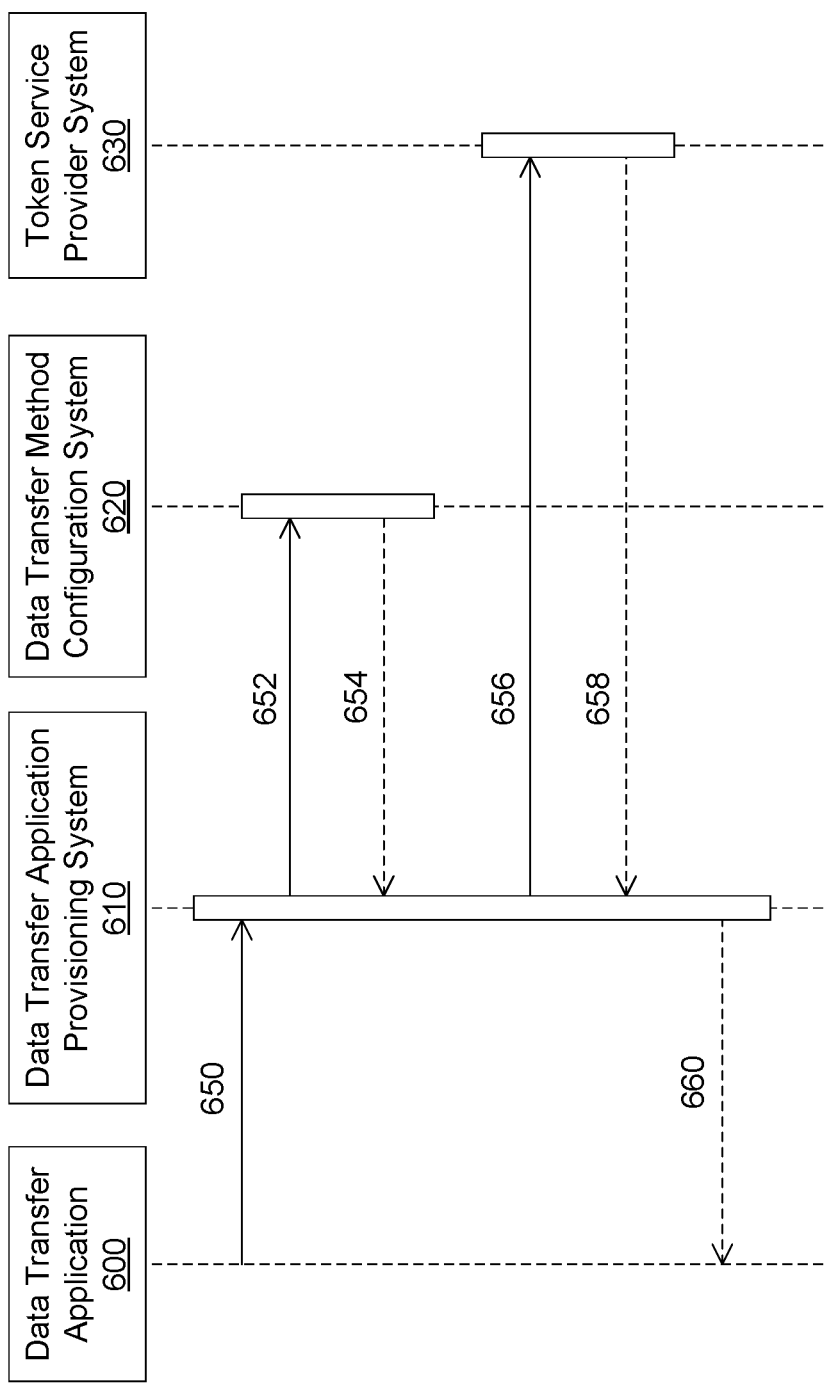
FIG. 6 is a sequence diagram depicting data transfers between computer systems, exemplary of an embodiment.

Various of the illustrated systems may correspond to the systems of FIG. 6. In particular, the mobile payment application 700 may correspond to the data transfer application 600, the card provisioning system 710 may correspond to the data transfer application provisioning system 610, card issuer API system 720 may correspond to the data transfer method configuration system 620, and the token service provider system 750 may correspond to the token service provider system 630. As noted above, the various systems of FIG. 6 may correspond to the systems of FIG. 1. Similarly, the illustrated systems of FIG. 7 may also correspond to the systems of FIG. 1. Specifically, mobile payment application 700 may correspond to the data transfer application of the electronic device 110, the card provisioning system 710 may correspond to the data transfer application provisioning system 100, the card issuer API system 720 may correspond to the data transfer method configuration system 120, and the token service provider system 750 may correspond to the token service provider system 130.

In the following description of FIG. 7, discussion is made of various messages being sent and received via a computer network. In some embodiments, the exchanged messages may or may not be implemented as messages such as was discussed in the description of FIG. 6 above.

Notably, each of the various messages 760-778 may be transmitted and handled by each of the actors 700-750 in real time or near real time, including sending any other messages responsive thereto as further described below. Conveniently, in this, way a data transfer method corresponding to a payment method may be provisioned in real time or near real time.

As illustrated, at the beginning of the sequence, mobile payment application 700 sends a message 760 to the card provisioning system 710. The message 760 may be a provisioning request for a payment method. For example, the message 760 may correspond to a provisioning request for a data transfer method that is a payment method such as may be received by particular embodiments of the data transfer application provisioning system 100 at the operation 410 (FIG. 4).

Next, responsive to the message 760, the card provisioning system 710 sends a message 762 to the card issuer API system 720. The message 762 may be a request for a data transfer identifier for a payment method. For example, the request may be for an account number or a PAN. The message 762 may correspond to a request for data transfer identifier such as may be sent by the data transfer application provisioning system 100 at the operation 420 (FIG. 4). Further, the message 762 may, additionally or alternatively, correspond to a request for a data transfer identifier such as may be received by the data transfer method configuration system 120 at the operation 510 (FIG. 5).

Next, responsive to the message 762, the card issuer API system 720 sends a message 764 to the credit origination manager system 730. The message 764 may be a request for origination or adjudication of credit such as where the payment method corresponds to a credit or charge account. In a specific example, the credit origination manager system 730 may be a server responsible for originating and/or adjudicating credit and the message 764 may correspond to a request sent to a such server as discussed in the above description of the operation 520 (FIG. 5) above.

Next, responsive to the message 764, the credit origination manager system 730 sends a message 766 to the card issuer API system 720. The message 766 may be a response to a request for origination or adjudication of credit. In a specific example, message 766 may be a reply to an origination/adjudication request as discussed in the description of the operation 520 above.

Next, responsive to the message 766, the card issuer API system 720 sends a message 768 to the card information system 740. The message 768 may be a request for a data transfer identifier for the payment method. In a specific example, the card information system 740 may be a card information server such as discussed above in the description of the operation 540 (FIG. 5) and the request may be for a particular form of identifier. For example, the request may be for a PAN.

Next, responsive to the message 768, the card information system 740 sends a message 770 to the card issuer API system 720 in reply. The message 770 may include a data transfer identifier. For example, the message 770 may include a PAN. The message 770 may correspond to a reply from a card information system as was mentioned in the description of the operation 540 above.

Next, responsive to the message 770, the card issuer API system 720 sends a message 772 to the card provisioning system 710 in reply to the message 762. The message 772 may provide a data transfer identifier. For example, the message 772 may provide a PAN. In a specific example, the message 772 may correspond to a reply to a request for a data transfer identifier such as may be received by the data transfer application provisioning system 100 at the operation 420 (FIG. 4). Additionally or alternatively, the message 654 may correspond to a reply to a request for a data transfer identifier such as may be sent by the data transfer method configuration system 120 at the operation 550 in response to a corresponding request sent at the operation 550 (FIG. 5).

Next, the mobile payment application 700 sends a message 774 to the token service provider system 750. For example, the message 774 may request a token corresponding to a data transfer identifier such as may have been received in message 774. In a specific example, the message 774 may correspond to a request for a data transfer token such as may be sent by the data transfer application provisioning system 100 at the operation 430 (FIG. 4).

Next, responsive to the message 774, the token service provider system 750 sends a message 776 to the card provisioning system 710 in reply. For example, the message 776 may provide a token corresponding to a data transfer identifier provided to the token service provider system 750 by way of the message 776. The token may be a payment token. For example, where the data transfer identifier is a PAN, the message 776 may include a tokenized PAN and/or a cryptographic PAN. The message 776 may correspond to a response to a request for a data transfer such as may be received by the data transfer application provisioning system 100 at the operation 430 in reply to a corresponding request sent at the operation 430.

In some embodiments, the token service provider system 750 may communicate with one or more other computer systems in providing a data transfer token. For example, if the data transfer token is a payment token for a card network, then the token service provider system 750 may communicate with a card network. For example, where the payment method corresponds to a Visa card, the token service provider system 750 may communicate with a Visa system.

Then, responsive to the message 776, the card provisioning system 710 sends a message 778 to the mobile payment application 700 in reply to the message 760. The message 776 may provide information for provisioning a payment method. In other words, the message 778 may be a reply to message 760. The message 778 may provide a payment token received in message 776. The message 760 may correspond to a reply to a provisioning request such as may be sent by the data transfer application provisioning system 100 at the operation 440 (FIG. 4).

Figure 4:
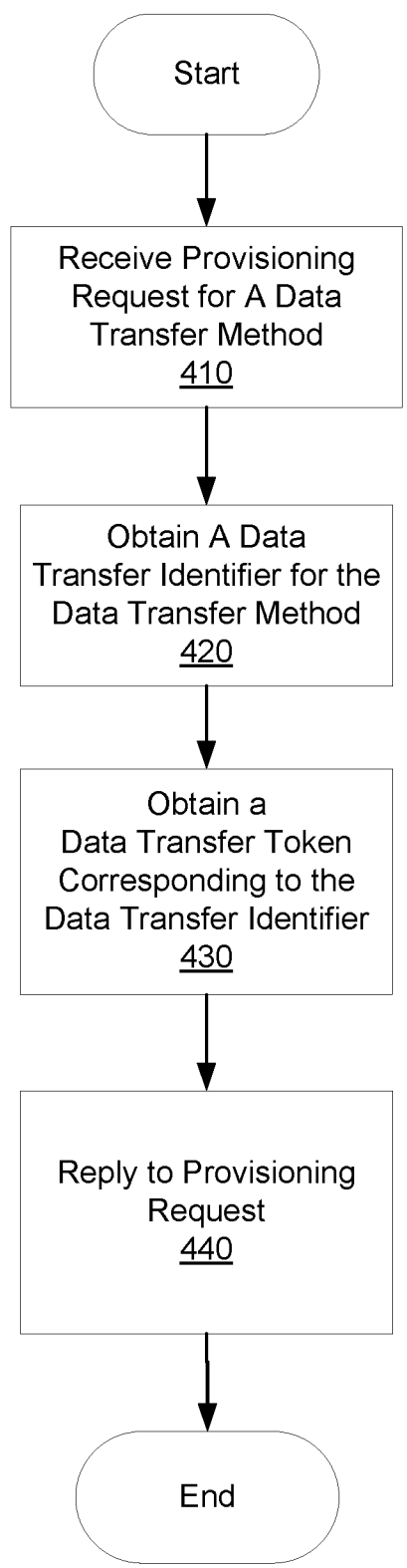
FIG. 4 is a flowchart depicting example operations performed by a data transfer application provisioning system.
Figure 5:
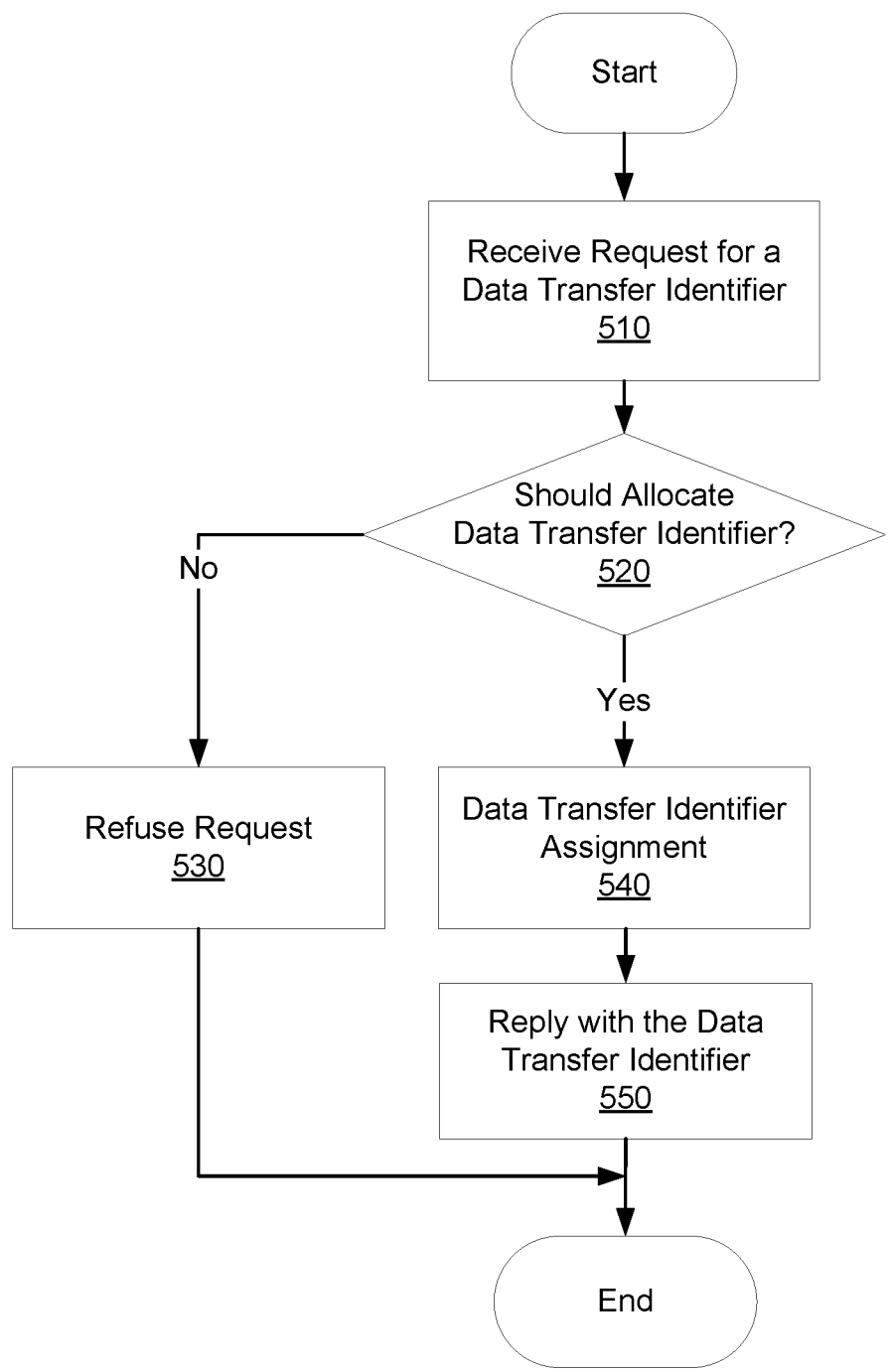
FIG. 5 is a flowchart depicting example operations performed by a data transfer method configuration system.

Notably, how the messages 760-778 of FIG. 7 may relate to the operations of FIGS. 4 and 5 and the computer systems of FIG. 1 has been discussed above. However, as also stated above various of the actors 700-750 may also correspond various of the actors 600-630 of FIG. 6 above. Accordingly, various of the messages 760-778 may correspond to or be similar to various of the messages 650-660 such as may be transmitted between corresponding ones of the actors 700-750 and the actors 600-630.

Notably, once a data transfer application has been provisioned for a particular method, then the associated device may be used for performing data transfers according to that data transfer method. For example, where, as in example FIG. 7, the provisioned data transfer method corresponds to a payment method, it may be that a mobile wallet application is provisioned for making payment method. For example, the application may use the payment token to allow the device to make a payment. This configuration may include configuring the device for Host Card Emulation (HCE) in manners known to skilled persons. For example, Android Pay may be configured. Payments may be made using a mobile device in manners known to skilled persons. Briefly put, a mobile device may be used to make an NFC payment at a POS system of a merchant. The POS system may communicate with a card network in order to authorize and receive clearance of a transaction. The card network may communicate with a merchant bank or an acquirer and an issuer bank in order to settle a transaction.

As discussed above, various request and reply messages may be sent over a computer network. As known to skilled persons, messages sent via some computer networks may be vulnerable to interception. Accordingly, various techniques such as, for example, encryption may be employed to secure message transmissions. For example, if various requests or replies are made using web services then the various related network connections may be secured such as by way of, for example, use of Secure Sockets Layer (SSL)/Transport Layer Security (TLS).

In another example, where the data transfer method(s) being provisioned correspond to payment methods, appropriate payment industry security standards may be adhered to in an effort to provide transport security and, more broadly, in securing and configuring the various computer systems. For example, where the payment methods correspond a payment card such as, for example credit or debit cards, the Payment Card Industry Data Security Standard (PCI-DSS) may be followed.

In some embodiments, data transfer identifiers may not be tokenized and the mobile payment application may instead receive a (untokenized) data transfer identifier. For example, the mobile payment application may receive a PAN. In a particular example, it may be that the data transfer application provisioning system 100 performs a method similar to that illustrated in FIG. 4 and described above but that method omits or varies the operation of obtaining a data transfer token corresponding to the data transfer identifier. For example, it may be that the operation 430 (FIG. 4) is omitted and control flow proceeds from the operation 420 to the operation 440. In some such embodiments, it may be that at the operation 440 the response includes the data transfer identifier obtained at the operation 420. Additionally, at the operation 440 the response may not include a data transfer token. Notably, in some such embodiments, the token service provider system 130 may be omitted. In another particular example, referring to FIG. 7, it may be that in some embodiments, the message 774 and the message 776 are omitted and that, responsive to the message 772, the card provisioning system 710 sends the message 778 to the mobile payment application 700 in reply to the message 760. In such embodiments, the message 778 may provide a data transfer identifier such as, for example, was provided in the message 772. Additionally, the message 778 may not provide a payment token. In some such embodiments, the token service provider system 750 may be omitted.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer system comprising:
   a processor;
   a communications module, coupled to the processor, for communicating with one or more computer networks; and
   a memory coupled to the processor and storing instructions that, when executed by the processor, cause the processor to:
   receive, from a mobile device using the communications module, a provisioning request for provisioning the mobile device with a payment method corresponding to a new credit account to be opened for a user in at least near-time, the provisioning request including identifying information for the user, the identifying information including an actual name of the user and a government identification number of the user;
   validate the identifying information;
   responsive to validation of the identifying information, send, to a server associated with the payment method using the communications module, a request, based on the provisioning request, to open the new credit account for the user and for assignment of a payment identifier to the new credit account, wherein the server is adapted to, responsive to the request, initiate automated adjudication as to whether credit should be extended to the user and the new credit account opened;

receive, in at least near real time from the server using the communications module, an indication providing a newly-assigned payment identifier responsive to the request to open the new credit account for the user and for assignment of a payment identifier to the new credit account, the indication corresponding to a positive adjudication decision and the newly-assigned payment identifier including a primary account number (PAN) corresponding to the new credit account opened for the user responsive to the positive adjudication decision;

obtain a single-use payment token corresponding to the newly-assigned payment identifier for making payments using the new credit account by:

sending, to a token service provider using the communications module, a request for the single-use payment token comprising the newly-assigned payment identifier;

receiving, from the token service provider using the communications module, the single-use payment token in response to the request for the single-use payment token, wherein the single-use payment token includes at least one of a tokenized PAN based on the PAN and a cryptographic PAN based on the PAN; and, send, to the mobile device using the communication module, a reply to the provisioning request comprising the single-use payment token for use in provisioning the mobile device for making payments using the payment method corresponding to the new credit account using the single-use payment token;

receive, from the mobile device using the communication module, a request for payment using the single-use payment token, the request including the single-use payment token that comprises the at least one of the tokenized PAN and the cryptographic PAN; and complete a transaction based on the received single-use payment token.

2. The system of claim 1 wherein the provisioning request is received via a web-based application.

3. The system of claim 1 wherein the provisioning request is received as a web services application programming interface (API) call and wherein the provisioning request is received from a web-based application responsive to another request received via the web-based application.

4. The system of claim 1 wherein the request for assignment of the payment identifier is made using a web services application programming interface (API) hosted by the server and wherein sending the request for assignment of a payment identifier comprises making a call to the web services API.

5. The system of claim 1 wherein the server is associated with an issuer of the new credit account.

6. The system of claim 1 wherein the payments that the mobile device is adapted to provision itself for making using the payment method are near field communication (NFC) payments.

7. The system of claim 1 wherein the automated adjudication as to whether credit should be extended to the user includes adjudicating a credit limit for the new credit account.

8. A computer-implemented method comprising:

receiving, from a mobile device using a communications module, a provisioning request to provision the mobile device with a payment method corresponding to a new credit account to be opened for a user in at least near-time, the provisioning request including identifying information for the user, the identifying information including an actual name of the user and a government identification number of the user;

validating the identifying information;

responsive to validation of the identifying information, sending, to a server associated with the payment method using the communications module, a request, based on the provisioning request, to open the new credit account for the user and for assignment of a payment identifier to the new credit account, wherein the server is adapted to, responsive to the request, initiate automated adjudication as to whether credit should be extended to the user and the new credit account opened;

receiving, in at least near real time from the server using the communications module, an indication providing a newly-assigned payment identifier responsive to the request to open the new credit account for the user and for assignment of a payment identifier to the new credit account, the indication corresponding to a positive adjudication decision and the newly-assigned payment identifier including a primary account number (PAN) corresponding to the new credit account opened for the user responsive to the positive adjudication decision;

obtaining a single-use payment token corresponding to the newly-assigned payment identifier for making payments using the new credit account by:

sending, to a token service provider using the communications module, a request for the single-use payment token comprising the newly-assigned payment identifier;

receiving, from the token service provider using the communications module, the single-use payment token in response to the request for the single-use payment token, wherein the single-use payment token includes at least one of a tokenized PAN based on the PAN and a cryptographic PAN based on the PAN; and, sending, to the mobile device using the communication module, a reply to the request to provision the payment method comprising the single-use payment token for use in provisioning the mobile device for making payments using the payment method corresponding to the new credit account using the single-use payment token;

receiving, from the mobile device using the communication module, a request for payment using the single-use payment token, the request including the single-use payment token that comprises the at least one of the tokenized PAN and the cryptographic PAN; and completing a transaction based on the received single-use payment token.

9. The method of claim 8 wherein the provisioning request is received via a web-based application.

10. The method of claim 8 wherein the request to provision the payment method is received as a web services application programming interface (API) call and wherein the provisioning request is received from a web-based application responsive to another request received via the web-based application.

11. The method of claim 8 wherein the request for assignment of the payment identifier is made using a web services application programming interface (API) hosted by the server and wherein sending the request for assignment of a payment identifier comprises making a call to the web services API.

12. The method of claim 8 wherein the server is associated with an issuer of the new credit account.

13. The method of claim 8 wherein the payments that the mobile device is adapted to provision itself for making using the payment method are near field communication (NFC) payments.

14. The method of claim 8 wherein the automated adjudication as to whether credit should be extended to the user includes adjudicating a credit limit for the new credit account.

15. A non-transitory computer-readable storage medium storing instructions that, when executed by a processor of a computer system, cause the computer system to:
receive, from a mobile device using a communications module, a provisioning request for provisioning the mobile device with a payment method corresponding to a new credit account to be opened for a user in at least near-time, the provisioning request including identifying information for the user, the identifying information including an actual name of the user and a government identification number of the user;
validate the identifying information;
responsive to validation of the identifying information, send, to a server associated with the payment method using the communications module, a request, based on the provisioning request, to open the new credit account for the user and for assignment of a payment identifier to the new credit account, wherein the server is adapted to, responsive to the request, initiate automated adjudication as to whether credit should be extended to the user and the new credit account opened;
receive, in at least near real time from the server using the communications module, an indication providing a newly-assigned payment identifier responsive to the request to open the new credit account for the user and for assignment of a payment identifier to the new credit account, the indication corresponding to a positive adjudication decision and the newly-assigned payment identifier including a primary account number (PAN) corresponding to the new credit account opened for the user responsive to the positive adjudication decision;
obtain a single-use payment token corresponding to the newly-assigned payment identifier for making payments using the new credit account by:
sending, to a token service provider using the communications module, a request for the single-use payment token comprising the newly-assigned payment identifier;
receiving, from the token service provider using the communications module, the single-use payment token in response to the request for the single-use payment token, wherein the single-use payment token includes at least one of a tokenized PAN based on the PAN and a cryptographic PAN based on the PAN; and,
send, to the mobile device using the communication module, a reply to the provisioning request comprising the single-use payment token for use in provisioning the mobile device for making payments using the payment method corresponding to the new credit account using the single-use payment token;
receive, from the mobile device using the communication module, a request for payment using the single-use payment token, the request including the single-use payment token that comprises the at least one of the tokenized PAN and the cryptographic PAN; and
complete a transaction based on the received single-use payment token.

16. The non-transitory computer-readable storage medium of claim 15 wherein the request for assignment of the payment identifier is received via a web-based application or made using a web services application programming interface (API).

* * * * *